Dec. 7, 1948.    J. EATON    2,455,663
CHUCK
Filed Nov. 15, 1945    3 Sheets-Sheet 1

Inventor:-
John Eaton,
By:- Smith, Michael & Gardiner,
Attorneys.

Dec. 7, 1948.    J. EATON    2,455,663
CHUCK

Filed Nov. 15, 1945    3 Sheets-Sheet 2

Inventor:-
John Eaton,
By: Smith, Michael & Gardiner,
Attorneys.

Dec. 7, 1948.  J. EATON  2,455,663
CHUCK
Filed Nov. 15, 1945  3 Sheets-Sheet 3
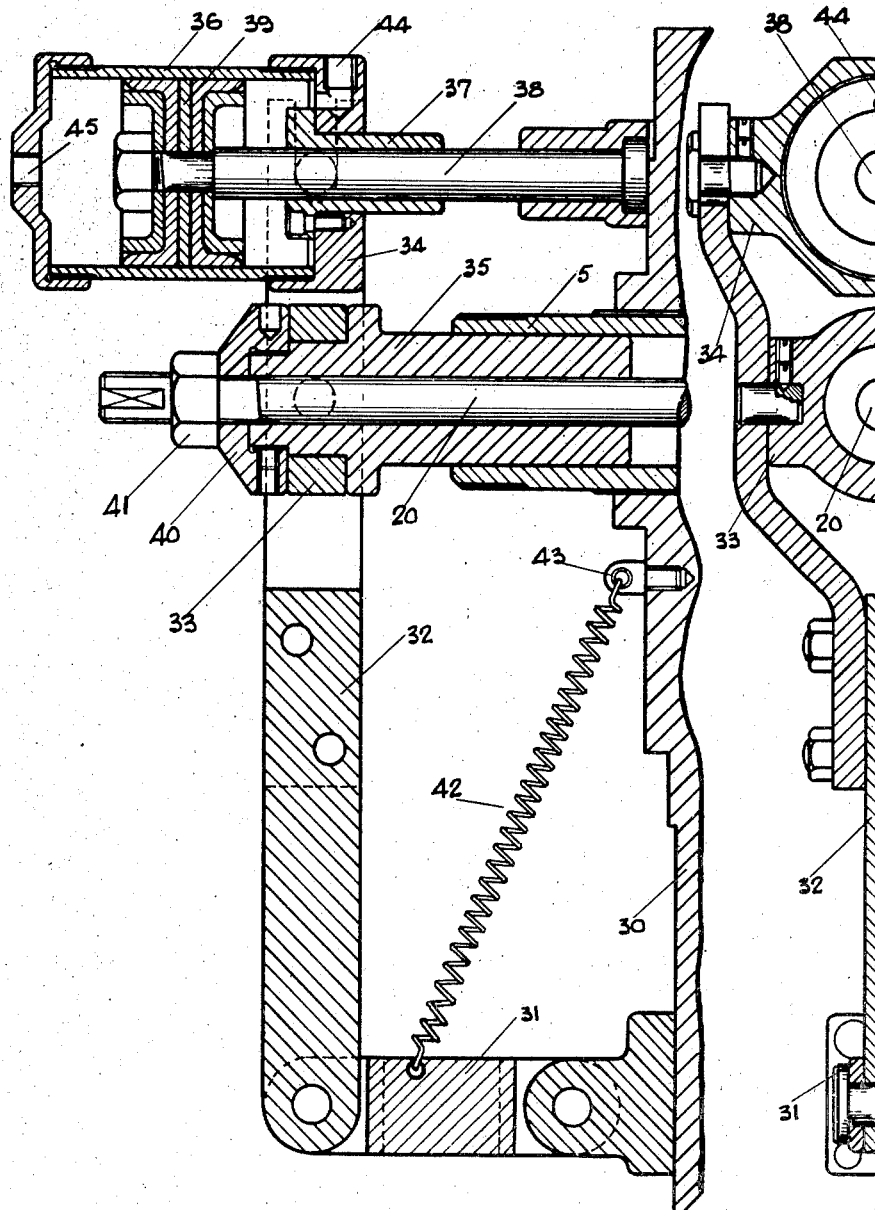

Patented Dec. 7, 1948

2,455,663

UNITED STATES PATENT OFFICE 2,455,663

CHUCK

John Eaton, Cheltenham, England, assignor to Stanley Charles Icke, Solihull, England Application November 15, 1945, Serial No. 628,695
In Great Britain November 23, 1944

12 Claims. (Cl. 279—118)

This invention has reference to work holding and similar rotary chucks for lathes and like machines.

The principal object of the present invention is to enable the jaws of a chuck to be locked automatically when taken to their work-gripping positions so that there is no necessity to apply a manual, pneumatic, hydraulic or other load or pressure on the jaw actuating means or otherwise make special provision for preventing the jaws moving under the action of centrifugal force, when the chuck is being rotated.

A further object of the invention is to provide a chuck which is of simple and robust construction, and which comprises the minimum number of moving parts so that frequent maintenance and/or supervision is rarely required and the chuck has a long useful life.

Another object of the invention is to provide a chuck in which the jaws are adapted to be operated rapidly and easily to and from their work gripping positions.

Still another object of the invention is to provide a chuck which does not necessitate the provision of a separate key or other tool for taking the jaws to their work gripping positions.

Still another object of the invention is to enable the jaws of a chuck to be adjusted relatively to one another, in a rapid and easy manner, to enable work pieces of varying dimensions, within limits, to be gripped in the same chuck.

A further object of the invention is to provide simple and robust pneumatically controlled means for operating the jaws of the chuck, the said operating means being capable of being readily incorporated in any lathe or like machine and being suitable for use for operating chucks of various sizes.

These and other objects and advantages of the invention will become apparent to those skilled in the art upon reference to the accompanying specification, claims and drawings.

In order that the invention may be more readily understood and carried into practice, reference will now be made to the accompanying drawings wherein:

Figure 5 is a sectional elevation of mechanism for actuating the draw bar, and

Figure 6 is a sectional elevation at right angles to Figure 5.

Figure 1:
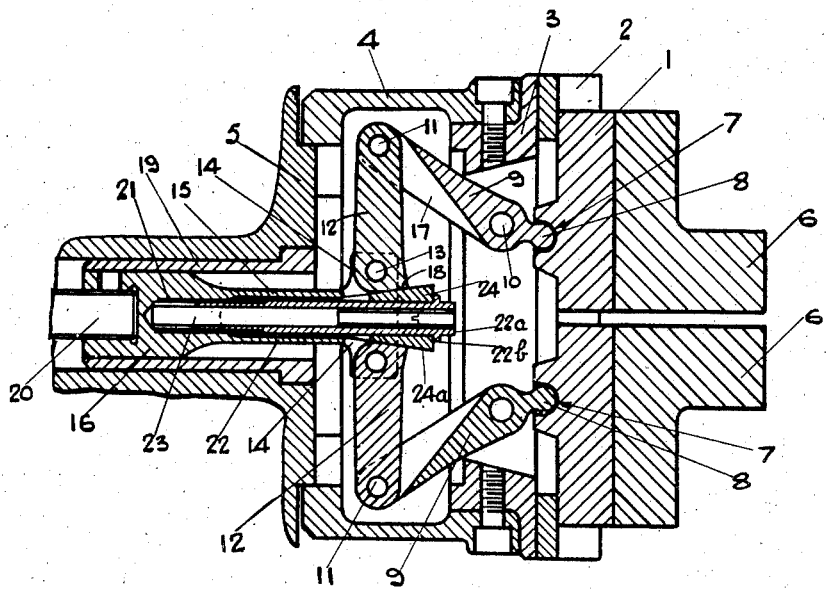
Figure 1 is a sectional elevation showing the chuck jaws in their work gripping positions.
Figure 2:
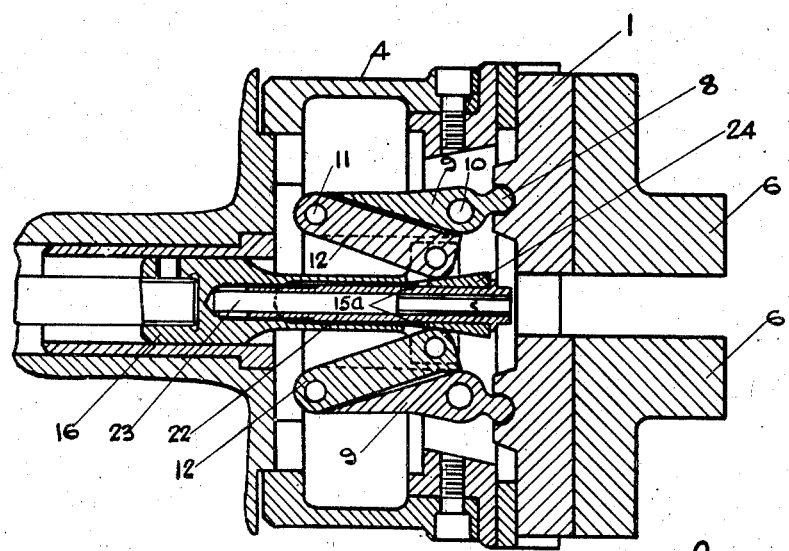
Figure 2 is a similar view to Figure 1 except that it shows the jaws expanded ready to receive a work piece.

The chuck shown in Figures 1 and 2 comprises a pair of permanent jaws 1 which are slidably housed-in radial channels 2 formed in the face of an annular insert 3 fixed in the mouth of a housing 4, the housing being carried upon the lathe spindle 5. The said permanent jaws are adapted to carry any desired temporary work-holding or false jaws 6 as is common practice.

Each permanent jaw 1 is formed with a slot 7 in its rear face, that is, the face adjacent the housing. The said slot is engaged by a roller-like head 8 on a jaw-lever 9; the said lever is pivoted upon a pin 10 carried by the insert 3, at a short distance from the said roller-like head. The other end of the jaw-lever 9 is journalled by a pin 11 to one end of a complementary over-centre lever 12, the other end of which is hinged by a pin 13 between cheeks 14 formed on the end of a resilient arm 15 of a plunger 16. The levers 9, 12, are thus coupled togglewise between the plunger 16 and the complementary permanent jaws 1. The jaw-lever 9 is formed longitudinally, with a channel or slot 17, which is adapted to receive the journalled end of the over-centre lever 12 so as to enable the toggle to be collapsed substantially completely. The said hinged end of the over-centre lever 12 is formed with a flattened edge or heel 18.

The plunger 16 is slidably housed in a sleeve-like bush 19 fitted within the bore of the lathe spindle, is connected co-axially to one end of a draw-bar 20 which extends axially of the said bore, and is arranged so that the resilient arms 15 project into the centre of the toggle housing 4.

The plunger is also formed with a blind axial and tapped hole or pocket 21 with which an externally and internally threaded tube 22 engages. The tube 22 extends into the toggle housing beyond the ends of the resilient lever-carrying arms 15, and is formed with a hexagonal head 22ᵃ and a peripheral shoulder 22ᵇ. The head is accessible by a tool, such as a box spanner, inserted between the chuck jaws 1 and 6 to permit of the tube being rotated in the blind hole or pocket 21 and thereby being adjusted longitudinally relatively to the resilient arms and toggles. A screw 23, screwed into the interior of the tube 22, is formed with a slotted head capable of being engaged by a screw driver inserted between the chuck jaws, so that it may be rotated in, and displaced longitudinally relatively to, the said tube. Thus, the inner end of the screw 23 may be taken into contact with, and may thrust against, the bottom of the blind hole or pocket 21 for locking the sleeve 22 in position.

A wedge 24 is carried on the tube 22 with its deeper end in abutment with the peripheral collar 22ᵇ. This wedge is formed with four inclined flat faces 24ᵃ, the said faces on two opposed sides of the wedge seat against the inner surfaces 15ᵃ on the plunger arms 15. The said wedge-contacting faces 15ᵃ diverge at the same angle as the wedge faces so that any longitudinal adjustment of the tube 22 causes the wedge to be located at a greater or lesser distance in between the arm ends so as to vary the distance to which the latter are forced apart. The said two inclined wedge faces are also contacted by the flattened edges or heels 18 of the over centre levers 12, when the jaws are in their work-gripping positions. Thus, by increasing or decreasing the distance between the said arm ends, the distances between the hinge pins 11 and between the work holding faces of the jaws 6, when in their work gripping positions, are increased or decreased.

The arrangement is preferably such that the two pairs of toggle levers are arranged in a common plane on opposite sides of the resilient arms. Thus by actuating the draw-bar to move the armed plunger and wedge assembly towards the jaw-carrying end of the housing, the toggles are collapsed. The journalled connections 11 between the levers therefore move towards the centre of the housing, causing the jaw levers to turn on their pivot pins in the direction which takes their roller-like heads 8, and, consequently the jaws, radially of the housing towards the periphery of the latter, thereby opening the jaws.

Conversely, by actuating the draw-bar in the reverse direction, the plunger and wedge assembly is drawn away from the jaws. The toggles are thus expanded and the jaw levers swing in the direction which move the jaws together to hold a work piece. Simultaneously, the over-centre levers move towards their dead-centre positions wherein they are at right angles to the resilient arms, and as they pass over the said positions, away from the jaws, their flat faces or heels 18 contact the wedge faces thereby preventing any further movement of the toggles, jaws, draw bar, and plunger.

Since the over-centre levers are now past their dead-centre positions, then, when the chuck is in use and is rotating at speed, the action of centrifugal force on the jaws, which tends to separate the latter, tends to expand the toggles. This expansion, however, is prevented by the contact between the lever heels and the wedge faces and, therefore, the jaws are locked.

To enable the jaws to grip a work piece of larger cross-sectional dimensions, the sleeve 22 is unlocked after the jaws have been opened by withdrawing the screw 23 out of contact with the bottom of the plunger bore 21, and the said sleeve is then rotated in the direction which permits the wedge to be withdrawn partially from between the resilient arms 15. The said arms, therefore, flex inwardly towards one another thereby moving the fulcra of the over-centre levers inwardly of the housing and swinging the jaw levers through a small angle around the pins 10 in the direction which increases the distance between the expanded jaws. Consequently, when the draw bar is actuated to displace the jaws inwardly towards one another then, as the draw-bar and jaw movements strokes are constant or substantially constant, the distance between the work-gripping faces of the jaws, when they assume their work-gripping positions, will be increased by a corresponding amount.

Figure 3:
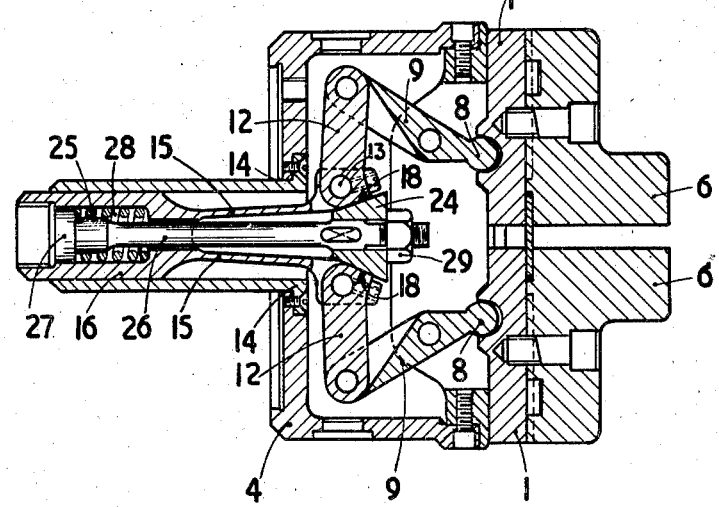
Figure 3 is a similar view to Figure 1 of an alternative or modified form of chuck, showing the jaws in a work-gripping position.
Figure 4:
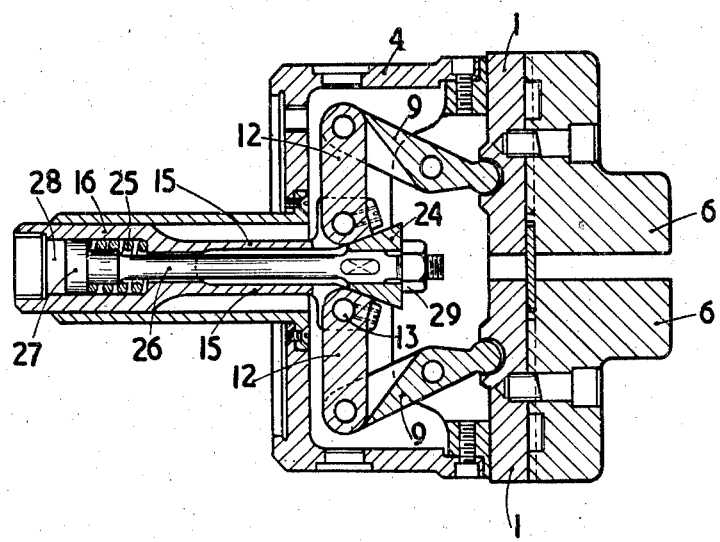
Figure 4 is a sectional elevation similar to Figure 3, but showing the jaws positioned for gripping work of larger dimensions than when positioned as shown in Figure 3.

In the chuck shown in Figures 3 and 4, such adjustment is effected automatically because, instead of having a rigid connection between the wedge 24 and plunger 16, this connection is effected through a coil spring 25. This spring is carried upon one end of a rod 26 having an enlarged head 27 which forms one of the spring abutments. The head is slidable within a housing 28 provided in the plunger 16 and the end of the said housing forms the other spring abutment. The rod 26 extends between the flexible plunger arms 15 into the toggle housing 4 and carries the wedge 24 on its end located within the said housing; the wedge is keyed upon the rod in such manner that it can slide longitudinally thereon, but is normally retained by the spring 25 in abutment with a nut 29, screwed on to the rod 26, and the inclined flat faces or heels 18 of the over-center levers 12.

Consequently, when the draw-bar is actuated to move the toggles from their collapsed to their expanded positions, to cause the jaws to grip a work piece, the plunger 16, rod 26 and wedge 24 move as a unit until the work gripping faces of the jaws impact the work piece. Whereupon, any continued movement of the draw-bar sets up a relative movement between the plunger and rod, causing the heels of the flexible arms to slide down the wedge faces, and compressing the spring between its abutments; the over-centre toggle levers are taken past their dead-centre positions by the travel of the pins 13 away from the jaws.

A pneumatically controlled mechanism, suitable for actuating the draw bar, is shown in Figures 5 and 6. This mechanism is mounted on the rear end of the lathe head stock 30; it comprises a link 31 journalled between the head stock, at a position below the lathe spindle 5, and the lower end of the lever 32 having a bifurcated upper end. Two superimposed trunnion blocks 33 and 34 are journalled between the arms of the said bifurcated end. The lower block 33 embraces a sleeve 35 carried on the rear end of the draw bar 20 whereas a pneumatic cylinder 36 is carried by the upper block 34 which block is provided with a bush 37 through which extends the rod 38 of a double-acting piston 39 housed within the cylinder, the said rod and piston being fixed to the head stock.

The lower trunnion block 33 is socketed on to the end of the draw bar sleeve 35 and is held in position by a collar 40 screwed on to the rear end of the draw bar and locked in position by a nut 41.

In order that the head stock spindle 5 may carry as little weight as possible, the mass of the lever and trunnion blocks is balanced by a tension spring 42 connected between the link 31 and an anchorage 43 carried on the rear end of the head stock between the said link and the lathe spindle.

A compressed air pipe is connected between each of the inlets 44, 45, in the ends of the cylinder and a control valve (not shown) mounted in a position on the lathe where it is readily accessible to the operator. Thus by admitting compressed air to the cylinder, through the inlet 45, the said cylinder may be driven along its piston rod, away from the lathe stock to pull the lever 32, the draw bar 20 and its sleeve 35 longitudinally of the lathe spindle. This sliding movement is transmitted through the draw bar to the armed plunger and wedge assembly to expand the toggle and close the jaws upon a workpiece. The toggles are collapsed and the jaws are opened, by the admission of air to the cylinder through the inlet 44, so as to drive the said cylinder towards the lathe stock.

The draw bar sleeve may carry or operate a pointer or other suitable indicating device in order to show the exact position of the actuating mechanism.

The above arrangement of the draw bar actuating mechanism avoids any connections in the compressed air supply between rotary and stationary parts so that there is little likelihood of air leaks being created. Also, since no force is required to hold the jaws in their open or closed positions, the cylinder may be exhausted immediately the jaw closing and opening operations are complete.

Although the invention has been particularly described with reference to a two-jaw chuck, it is equally applicable to chucks comprising three or four jaws. Also any other form of mechanism, other than the pneumatic mechanism described above, may be provided for actuating the draw bar.

Having thus described the invention, what I claim and desire to secure by Letters Patent is:

1. A rotary chuck comprising a system of work-gripping jaws slidable relatively to one another in a radial direction, an axially slidable draw-bar disposed centrally of the said jaw system, a plunger connected co-axially to the draw bar at one end and formed with a system of resilient arms, equal in number to the jaws, at the other end, a wedge carried by the plunger and extending between the said arms, and a separate toggle-link coupling each arm to a jaw and comprising two levers one of which is hingedly connected to the jaw, whereas the other is hingedly connected to the arm and is carried over a position of dead centre into abutment with the wedge as the jaw is taken to its work-gripping position.

2. A rotary chuck comprising a rotatable housing, work gripping jaws mounted in a radially slidable manner on the said housing, a longitudinally slidable plunger mounted co-axially of the housing, the said plunger being anchored to a draw bar at one end and being formed with a system of resilient arms, equal in number to the jaws, at its other end, a toggle link coupling each resilient arm to a separate jaw and comprising two levers one of which is journalled in the housing and is hingedly connected to and between the complementary jaw and the other lever which latter is hingedly connected to the said resilient arm, and a wedge mounted on the plunger between the resilient arms and being abutted by the levers connected to the said arms as the said levers move through a dead-centre position when the plunger is longitudinally displaced away from the housing to expand the toggle links and take the jaws to their work gripping positions.

3. A rotary chuck comprising a rotatable housing, work gripping jaws mounted in a radially slidable manner on the said housing, a longitudinally slidable plunger being anchored to a draw-bar at one end and being formed with a system of resilient arms, equal in number to the jaws, at its other end, a toggle link coupling each resilient arm to a separate jaw and comprising two levers one of which is journalled in the housing and is hingedly connected to and between the complementary jaw and the other lever, which latter lever is hingedly connected to the said resilient arm, and a wedge mounted on the plunger between the resilient arms and being abutted by the levers connected to the said arms as the said levers move through a dead centre position when the plunger is longitudinally displaced away from the housing to expand the toggle links and take the jaws to their work-gripping positions, the said wedge being adjustable longitudinally of the said plunger to enable the chuck to grip work of different cross-sectional dimensions.

4. A rotary chuck comprising a rotatable housing, work gripping jaws mounted in a radially slidable manner on the said housing, a longitudinally slidable plunger mounted co-axially of the housing, the said plunger being anchored to a draw bar at one end and being formed with a system of resilient arms, equal in number to the jaws, at its other end, a toggle link coupling each resilient arm to a separate jaw and comprising two levers one of which is journalled in the housing and is hingedly connected to and between the complementary jaw and the other lever, which latter lever is hingedly connected to the said resilient arm and is formed with a flat face at its end connected to the said arm, and a wedge mounted on the plunger between the resilient arms, the inclined wedge faces being abutted by the flat lever faces as the said levers move through a dead centre position when the plunger is longitudinally displaced away from the housing to expand the links and take the jaws to their work-gripping positions.

5. A rotary chuck comprising a rotatable housing, work gripping jaws mounted in a radially slidable manner on the said housing, a longitudinally slidable plunger mounted coaxially of the housing and being anchored at one end to a draw-bar, the other end of the said plunger being formed with a system of resilient arms, equal in number to the jaws, and with an axial blind tapped hole, a threaded and tapped sleeve engaging the said hole, a screw engaging within the said sleeve and abutting the end of the hole and a wedge mounted around the sleeve between the resilient arms, a toggle link coupling each resilient arm to a separate jaw and comprising two levers one of which is journalled in the housing and is hingedly connected to and between the complementary jaw and the other lever which latter lever is hingedly connected to the said resilient arm and is adapted, when moved through a dead centre position by the longitudinal displacement of the plunger away from the housing to expand the links and take the jaws to their work-gripping position, to abut the said wedge.

6. A rotary chuck comprising a plurality of work gripping jaws slidable relatively to one another in a radial direction, a longitudinally slidable plunger located at right angles to and centrally of the paths of movement of the jaws, said plunger being anchored at one end to a draw bar and having an axial blind tapped hole and resilient arms, equal in number to the jaws, at the other end, a threaded and tapped sleeve engaging said hole and having an external peripheral shoulder thereon, a screw engaging within the said sleeve and abutting the end of the said hole, a wedge slidably mounted on and around the sleeve in abutment with the annular shoulder and providing inclined seatings for the resilient arms, and a toggle link operatively connecting each resilient arm to a complementary work-gripping jaw, each link comprising two levers one of which is journalled in the housing and is hingedly connected to and between the complementary jaw and the other lever, which latter lever is hingedly connected to the said arm and is carried through a position of dead-centre into abutment with the wedge as the said complementary jaw assumes its work-gripping position.

7. A rotary chuck comprising a system of work gripping jaws slidable relatively to one another in a radial direction, an axially slidable draw bar disposed centrally of the jaw system, a plunger anchored by one end to the said draw bar and being formed at its other end with a system of resilient arms, equal in number to the jaws, a rod disposed between the said arms and having a resilient connection to the plunger, a wedge carried by the said rod and projecting between the said arms and a separate toggle link connecting each arm to a separate jaw and comprising two levers one of which is journalled between its ends and is hingedly connected to and between the complementary jaw and the other lever, which latter lever is hingedly connected to the said resilient arm and is carried through a dead centre position into abutment with the wedge as the said complementary jaw reaches its work-gripping position.

8. A rotary chuck comprising a rotatable housing, work gripping jaws mounted in a radially slidable manner on the said housing, a longitudinally slidable plunger mounted co-axially of the housing being connected to a draw bar at one end, and being formed with a system of resilient arms, equal in number to the jaws, at the other end, a rod slidably housed within the plunger and being loaded by a spring tending to drive it towards the draw bar, a wedge slidably mounted on the rod between the resilient arms, and a toggle link connecting each resilient arm to a separate jaw, each toggle link comprising two levers one of which is journalled within the housing and is hingedly connected to and between the complementary jaw and the other lever, the latter lever being hingedly connected to the said resilient arm and being adapted to abut the wedge when moved through a dead centre position by the longitudinal displacement of the plunger away from the housing whereby the toggle links are expanded and the jaws are taken to their work gripping positions.

9. A rotary chuck comprising a system of work gripping jaws slidable relatively to one another in a radial direction, an axially slidable draw bar disposed centrally of the jaw system, a plunger anchored at one end to the said draw bar and having a chamber in the said anchored end and being formed at its other end with a system of resilient arms equal in number to the jaws, a rod slidably carried within the plunger and extending from the said chamber to between the resilient arms, the said rod having an enlarged head located within the chamber, a coil-spring compressed between the said head and the chamber end remote from the draw bar, a wedge carried by the rod between the resilient arms, a toggle link connecting each of the said arms to a separate jaw and comprising a pair of levers one of which is journalled intermediate its ends and is hingedly connected to and between the complementary jaw and the other lever, said other lever being hingedly connected to the complementary resilient arm and being carried through a dead centre position into abutment with the wedge as the complementary jaw is taken to its work gripping position by the expansion of the toggle links when the plunger is displaced longitudinally away from the jaw system.

10. A rotary chuck comprising a system of work gripping jaws slidable relatively to one another in a radial direction, a longitudinally slidable hollow plunger disposed centrally of the said jaw system and anchored to a draw bar at one end thereof, a separate toggle link coupling the other end of the said plunger to each jaw, each of the said links comprising two levers one of which is journalled intermediate its ends and is hingedly connected to and between the complementary jaw and the other lever which is hingedly connected to the plunger, a rod housed within and co-axially of the hollow plunger, the said rod being loaded by a spring urging the rod towards the draw bar and a wedge-like stop carried upon and adjustable longitudinally of the rod and located centrally of the said links and jaw system, the arrangement being such that as the levers which are hingedly connected to the plunger are swung about their fulcra by endwise movement of the said plunger in the direction which moves the jaws radially inwards, the said levers abut inclined faces of the stop after the toggle links have passed through positions of dead centre, to limit the angular movement of the levers and determine the work-gripping position of the jaws.

11. A rotary chuck comprising a rotatable housing, a system of work-gripping jaws mounted in a radially slidable manner on the said housing, a longitudinally slidable hollow plunger mounted co-axially of the housing and having one end coupled to a draw-bar, a separate toggle-link coupling the other end of the said plunger to each of the said jaws, each link comprising two levers one of which is journalled intermediate its ends and is hingedly connected to and between a complementary jaw and the other lever of which is hingedly connected to the plunger, and a wedge-like stop located within the housing centrally of the jaw and toggle-link system, the said stop being carried upon and being adjustable endwise of a rod housed within and co-axially of the plunger and being loaded by a spring which urges the rod towards the draw bar, the said stop having an inclined face adjacent each lever connection to the plunger, the arrangement being such that endwise movement of the plunger in the direction which rocks the said levers to impart inward radial movement to the jaws, causes each lever, after the link of which it forms a part has passed through its position of dead centre, to abut an inclined stop face thereby limiting the angular movement of the lever and determining the work-gripping position of the complementary jaw, the said position being variable by endwise movement of the stop upon the plunger.

12. A rotary chuck comprising a rotatable housing, work gripping jaws mounted in a radially slidable manner on the said housing, a longitudinally slidable hollow plunger mounted co-axially of the housing, the said plunger being anchored to a draw-bar at one end, a rod housed within and co-axially of the plunger, a spring loading the said rod and urging it towards the draw-bar, a cone-shaped stop assembled to the end of the rod remote from the draw-bar in a manner which permits adjustment of the said stop endwise of the rod, and a separate toggle link coupling the said plunger to each jaw and comprising two levers, one of which is journalled in the housing and is hingedly connected between the complementary jaws and the other lever, whereas the latter is hingedly connected to the plunger and is arranged to move through a dead centre position into abutment with the inclined periphery of the stop when the said plunger is longitudinally displaced away from the housing to expand the toggle links and take the jaws to their work-gripping positions, the said work-gripping positions being determined by the location of the said stop lengthwise of the rod.

JOHN EATON.

REFERENCES CITED

The following references are of record in the file of this patent:

UNITED STATES PATENTS

| Number | Name | Date |
|---|---|---|
| 915,173 | Hanson | Mar. 16, 1909 |
| 1,117,480 | Church | Nov. 17, 1914 |
| 1,813,705 | Lewis | July 7, 1931 |